(12) United States Patent
Ramphal et al.

(10) Patent No.: US 7,798,815 B2
(45) Date of Patent: Sep. 21, 2010

(54) COMPUTER-CONTROLLED TISSUE-BASED SIMULATOR FOR TRAINING IN CARDIAC SURGICAL TECHNIQUES

(75) Inventors: Paul S. Ramphal, Kingston (JM); Michael P. Craven, Nottingham (GB); Daniel Coore, Kingston (JM)

(73) Assignee: University of the West Indies, Kingston (JM)

( * ) Notice: Subject to any disclaimer, the term of this patent is extended or adjusted under 35 U.S.C. 154(b) by 1782 days.

(21) Appl. No.: 10/405,809

(22) Filed: Apr. 3, 2003

(65) Prior Publication Data
US 2004/0033477 A1 Feb. 19, 2004

Related U.S. Application Data

(60) Provisional application No. 60/369,325, filed on Apr. 3, 2002.

(51) Int. Cl.
A63F 9/24 (2006.01)
A63F 13/00 (2006.01)
G06F 17/00 (2006.01)
G06F 19/00 (2006.01)

(52) U.S. Cl. ............... 434/265; 434/262; 434/267; 434/268; 434/272; 514/6; 600/18; 604/53; 128/1; 128/344

(58) Field of Classification Search ............ 434/272, 434/267, 262, 265, 268; 446/295; 623/3.1–3.3
See application file for complete search history.

(56) References Cited

U.S. PATENT DOCUMENTS

| | | | | |
|---|---|---|---|---|
| 3,376,660 A | * | 4/1968 | McGinnis | 434/268 |
| 3,568,333 A | * | 3/1971 | Clark | 434/265 |
| 4,195,623 A | * | 4/1980 | Zeff et al. | 600/18 |
| 4,314,550 A | * | 2/1982 | Apstein | 600/16 |
| 4,794,631 A | * | 12/1988 | Ridge | 378/207 |
| 4,861,330 A | * | 8/1989 | Voss | 600/18 |
| 5,176,153 A | * | 1/1993 | Eberhardt | 623/913 |
| 5,365,933 A | * | 11/1994 | Elghazzawi | 600/510 |
| 5,374,194 A | * | 12/1994 | Walcerz et al. | 434/265 |
| 5,482,472 A | * | 1/1996 | Garoni et al. | 434/272 |
| 5,634,797 A | * | 6/1997 | Montgomery | 434/268 |

(Continued)

OTHER PUBLICATIONS http://www.datascope.com/ca/sys98xt.html.—Datascope balloon pump. Information released in 2000.*

(Continued)

Primary Examiner—John M. Hotaling, II
Assistant Examiner—Paul A. D'Agostino
(74) Attorney, Agent, or Firm—Wilmer Cutler Pickering Hale and Dorr LLP

(57) ABSTRACT

The present invention is directed to an electromechanical pumping system for simulating the beating of heart in a cardiac surgery training environment. A computer-controllable linear actuator is used to control the electromechanical pumping system.

In a preferred embodiment, the electromechanical pumping system is linked to a porcine heart. The heart is made to beat by inserting intra-ventricular balloons placed inside the heart and connected to the pumping system. When controlled by the electromechanical pumping system, the porcine heart is able to display normal and abnormal beating rhythms, as well as ventricular fibrillation.

In addition, an electronic pressure sensor incorporated into the pumping system can be used to trigger a ventricular fibrillation mode when the porcine heart attached to the pumping system is handled by a trainee surgeon.

23 Claims, 9 Drawing Sheets

U.S. PATENT DOCUMENTS

| | | | | |
|---|---|---|---|---|
| 5,786,326 | A | * | 7/1998 | Horwitz ..................... 514/11 |
| 5,877,146 | A | * | 3/1999 | McKenzie et al. ............. 514/6 |
| 5,941,710 | A | * | 8/1999 | Lampotang et al. ......... 434/272 |
| 5,947,744 | A | * | 9/1999 | Izzat ........................ 434/272 |
| 6,544,216 | B1 | * | 4/2003 | Sammler et al. ......... 604/95.03 |
| 6,629,469 | B2 | * | 10/2003 | Jaszczak et al. ............ 73/866.4 |
| 6,685,481 | B2 | * | 2/2004 | Chamberlain ............... 434/272 |
| 6,780,016 | B1 | * | 8/2004 | Toly ........................ 434/262 |
| 6,790,043 | B2 | * | 9/2004 | Aboud ...................... 434/268 |
| 2001/0019818 | A1 | * | 9/2001 | Yong ........................ 434/262 |
| 2001/0023346 | A1 | * | 9/2001 | Loeb ........................ 604/508 |
| 2001/0026794 | A1 | * | 10/2001 | Kovesdi et al. ........... 424/93.21 |
| 2002/0042701 | A1 | * | 4/2002 | Dancu et al. .................. 703/9 |
| 2003/0045803 | A1 | * | 3/2003 | Acharya ..................... 600/508 |
| 2003/0171294 | A1 | * | 9/2003 | Hung et al. .................. 514/12 |
| 2004/0126596 | A1 | * | 7/2004 | Zamora et al. .............. 428/447 |
| 2004/0260278 | A1 | * | 12/2004 | Anderson et al. ............. 606/32 |
| 2005/0202384 | A1 | * | 9/2005 | DiCuccio et al. ............ 434/262 |
| 2006/0078550 | A1 | * | 4/2006 | Levy et al. ................. 424/94.2 |

OTHER PUBLICATIONS http://www.datascope.com/ca/pdf/s98xt_brochure_us.pdf—Sales Brochure for the Datascope balloon pump. Copyright date of 2000 at the bottom of the brochure.*

Smith S.W., Lopath P.D., Adams D.B., Walcott G. P., Cardiac Ultrasound Phantom Using A Porcine Heart Model, Ultrasound in Med & Biol., vol. 2, No. 5, pp. 693-697, 1995.*

"High-tech heart simulation", CNN.com/Technlogy; www.cnn.com/2002/Tech/10/19/heart.simultor.ap/index.html.

"Use of a Pulsatile Beating Heart Model for Training Surgeons in Beating Heart Surgery", Department of Cardiothoracic Surgery, the Heart Surgery Forum, a cardiotheracic multimedia journal; www.hsforum.com.stories/articleReader$275.

* cited by examiner

COMPUTER-CONTROLLED TISSUE-BASED SIMULATOR FOR TRAINING IN CARDIAC SURGICAL TECHNIQUES

CROSS-REFERENCE TO RELATED APPLICATION

This application claims priority to U.S. Provisional Appl. No. 60/369,325 filed Apr. 3, 2002.

FIELD OF THE INVENTION

This invention generally relates to electromechanical pumps used to simulate a beating heart for cardiac surgery training. Specifically, the present invention provides for control of the beating mode of the simulator by means of an electromechanical pneumatic pump with associated control and display software, and provides for simulating a range of intra-operative cardiac behaviors typically found in beating heart surgery.

BACKGROUND

Surgical skills training is becoming increasingly important as medical technology advances. New surgical procedures typically require additional training before the trainee is ready to attempt surgery on real patients. This is especially true for many of the newer, minimally invasive surgical techniques, such as beating heart surgery. For example, coronary arterial bypass grafting (CABG) is a routine operation that requires much training and practice to reach and maintain an appropriate level of skill. Surgeons and surgical trainees alike benefit from practice of this and other types of surgery that use minimally invasive techniques.

In traditional cardiac surgery, the heart is arrested for surgery, and the field is dry and motionless. However, in beating heart surgery, the surgeon must perform surgical procedures while the heart continues to beat. There is consequently no safe and relatively easy situation in which to offer trainees the chance to perfect surgical skills on the beating heart, as it is not typically considered safe to allow new trainees to operate on real patients.

Additionally, in developing countries, lack of resources and high demand on a small number of trained surgeons make surgical skills training an especially important area, as trainee surgeons are typically under-exposed to surgical techniques. Even in developed counties, legislation placing a maximum on the number of hours worked per week also limits on-the-job training opportunities, as hospital doctors have less time for training during working hours.

Simulators are a known technique for providing addition surgical training. For surgical techniques that require an increased level of skill, such as minimally invasive surgery, simulators provide an especially valuable tool. Many known surgical training simulators use latex models of organs and/or computer-generated virtual reality systems. However, these provide only limited realism, and are expensive. Anaesthetized animals have been used for in vivo training, however the ethical concerns of using live animals for such training present a large drawback. There is therefore a need for an ex vivo simulator that can will provide surgeons a realistic training environment.

In the field of beating heart surgery, it is known to use a prosthetic model of a beating heart to simulate clinical situations of beating heart surgery. A prosthetic heart model attempts to duplicate the exposure and feel of a beating heart during surgery, and allows both the surgeon-in-training as well as the veteran surgeon the opportunity to develop skills needed for consistent results when performing cardiac surgery on the non-arrested heart.

While known prosthetic beating heart models provide the trainee surgeon with the ability to handle the prosthetic heart during simulation, and the ability to use stabilizers during training surgery, known prosthetic heart models do not allow for continuous perfusion of fluid through the prosthetic heart, nor do they provide for a realistic feel of the heart tissue. Known prosthetic hearts are typically composed of latex or silicone, which do not provide for a truly realistic feel and touch of human tissue. In addition, the lack of continuous perfusion may give a trainee a false impression of hemostasis and manipulation of the heart. Known prosthetic beating heart models therefore do not provide an environment that is realistic enough to simulate true beating heart surgery for training purposes.

In view of the foregoing considerations, it is clear that there is a need for realistic beating heart model that allows for continuous perfusion of fluid and provides a realistic feel of heart tissue. In addition, it would be advantageous to have a beating heart model that could simulate the range of normal and abnormal heart rhythms that may arise during surgery, such as those resulting from intra-operative events such as admission of drugs or from ventricular fibrillation.

It would be useful to have a beating heart simulator that provides a more realistic environment for surgical training, including continuous perfusion and simulation of the range of intra-operative cardiac behaviors typically found in heart surgery. The present invention provides such an apparatus and system.

SUMMARY OF THE INVENTION

It is the objective of the present invention to achieve the aforementioned objects through a computer-controlled electromechanical system that authentically simulates a beating heart, including realistic vital sign display, a range of intra-operative cardiac behaviors typically found in heart surgery, and coronary perfusion.

The foregoing and other objects of the invention are achieved by a method for simulating a beating heart in a mock chest cavity in an operating room environment for training a trainee surgeon on cardiac surgical techniques. The method comprises providing a simulator heart in the mock chest cavity, with at least one balloon being inserted into the heart; providing a pumping system connected the at least one balloon, said pumping system operative to inflate and deflate the at least one balloon, thereby simulating heartbeats in the simulator heart; and providing a control computer connected to said pumping system wherein the control computer controls and manages the pumping system and thereby the simulator heart.

In accordance with one embodiment of the invention, a beating heart simulation system for simulating a beating heart for training a surgeon on cardiac surgical techniques is provided. The simulation system comprises a pumping system; a simulator heart connected to the pumping system; a simulator display; and a computing device for controlling the pumping system, wherein the computing device is connected to the pumping system and the simulator display and controls the pumping system such that the pumping system causes the simulator heart to beat in a realistic manner.

In accordance with another embodiment of the invention, a pneumatic pump for use in a beating heart simulation system that uses a porcine heart, said pneumatic pump connected to said porcine heart through tubing, said pump being a diaphragm-type pneumatic pump driven by a linear actuator, is provided.

In accordance with another embodiment of the invention, a beating heart simulator apparatus is provided. The apparatus comprises a preserved porcine heart to simulate a human heart; preserved bovine coronary arteries to simulate human saphenous veins; at least one balloon inserted into the porcine heart, wherein said at least one balloon is connected to a pulsatile pump operative to inflate and deflate the at least one balloon in a rhythm that simulates a human heart beating rhythm.

DESCRIPTION OF THE PREFERRED EMBODIMENTS

Reference will now be made in detail to the preferred embodiments of the present invention, examples of which are illustrated in the accompanying drawings. It is to be understood that the figures and the description of the present invention included herein illustrate and describe elements that are of particular relevance to the present invention, while eliminating, for purposes of clarity, other elements that may be found in typical auction systems and computer networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

The present invention provides for cardiac surgical training in a realistic surgical environment through use of a simulator based on an electromechanical pneumatic pump driven by associated control and display software.

In a preferred embodiment of the present invention, animal organs are used to simulate human organs as they provide an inexpensive, realistic likeness of human tissue. Unlike latex or silicone prosthetic organs, the touch and feel of preserved animal organ tissue is almost identical to the touch and feel of human tissue. In particular, the structure of a porcine heart is analogous to the human heart, as is known to those skilled in the art. In a preferred embodiment of the present invention, a preserved porcine heart is animated to simulate a beating human heart through use of intra-ventricular balloons driven by a computer-controlled pulsatile pump.

Figure 1:
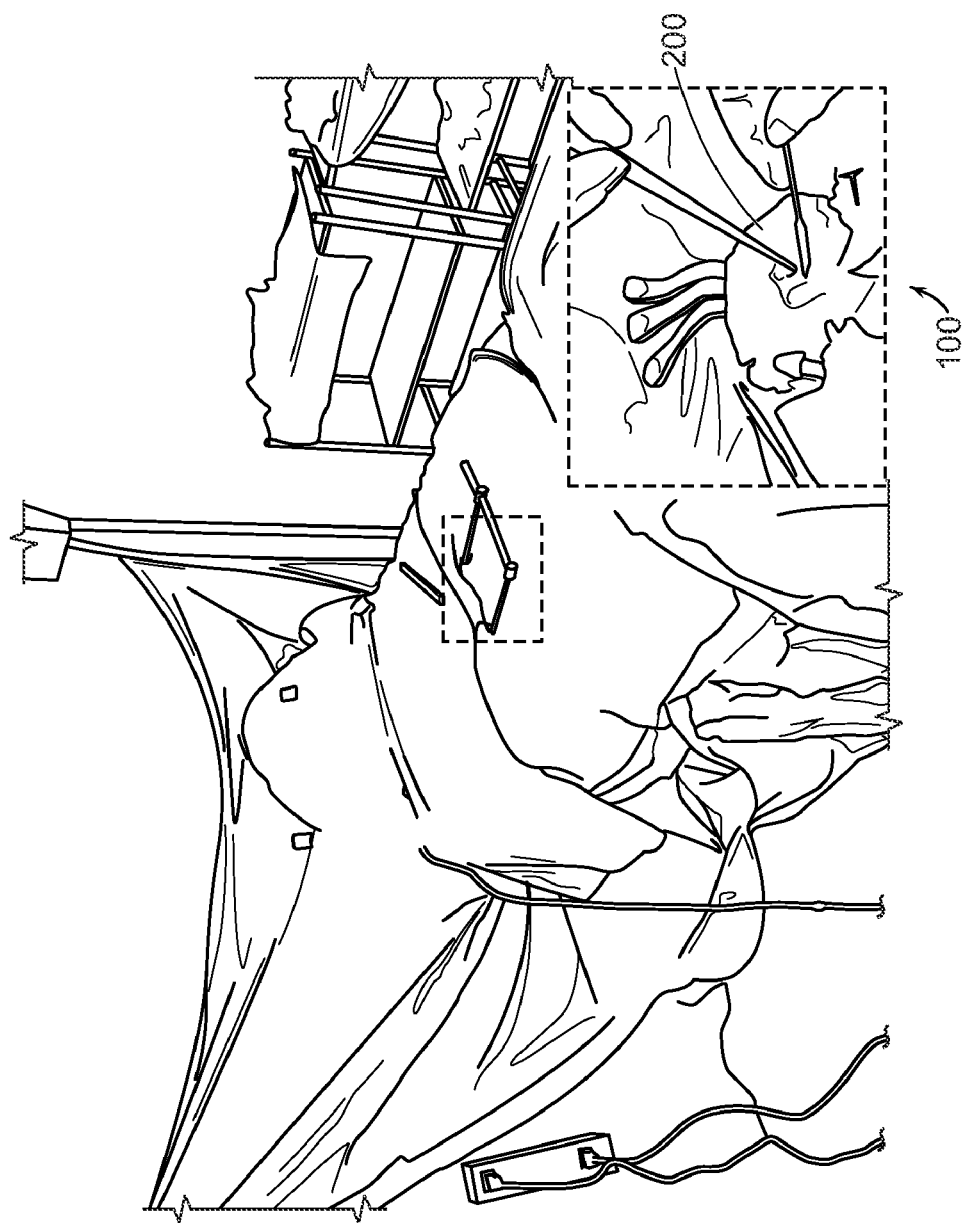
FIG. 1 illustrates the inventive beating heart simulation system of the present invention used in a surgical theatre environment.

In a preferred embodiment, the porcine heart is placed within a synthetic chest cavity in a mock operating theater environment, as shown in FIG. 1. As shown in more detail in inset 100, porcine heart 200 animated by the inventive pumping heart simulator of the present invention realistically models a beating human heart in a surgical environment.

To simulate a human heart for purposes of training for CABG surgical procedures, coronary arteries harvested from bovine (ox) heart are used to simulate human coronary arteries, as bovine coronary arteries are almost indistinguishable from human saphenous vein tissue used in actual CABG procedures. As will be obvious to those skilled in the art, different types of veins or arteries, either animal or latex, could be used to simulate other tissues that are important for other types of surgeries.

Figure 2:
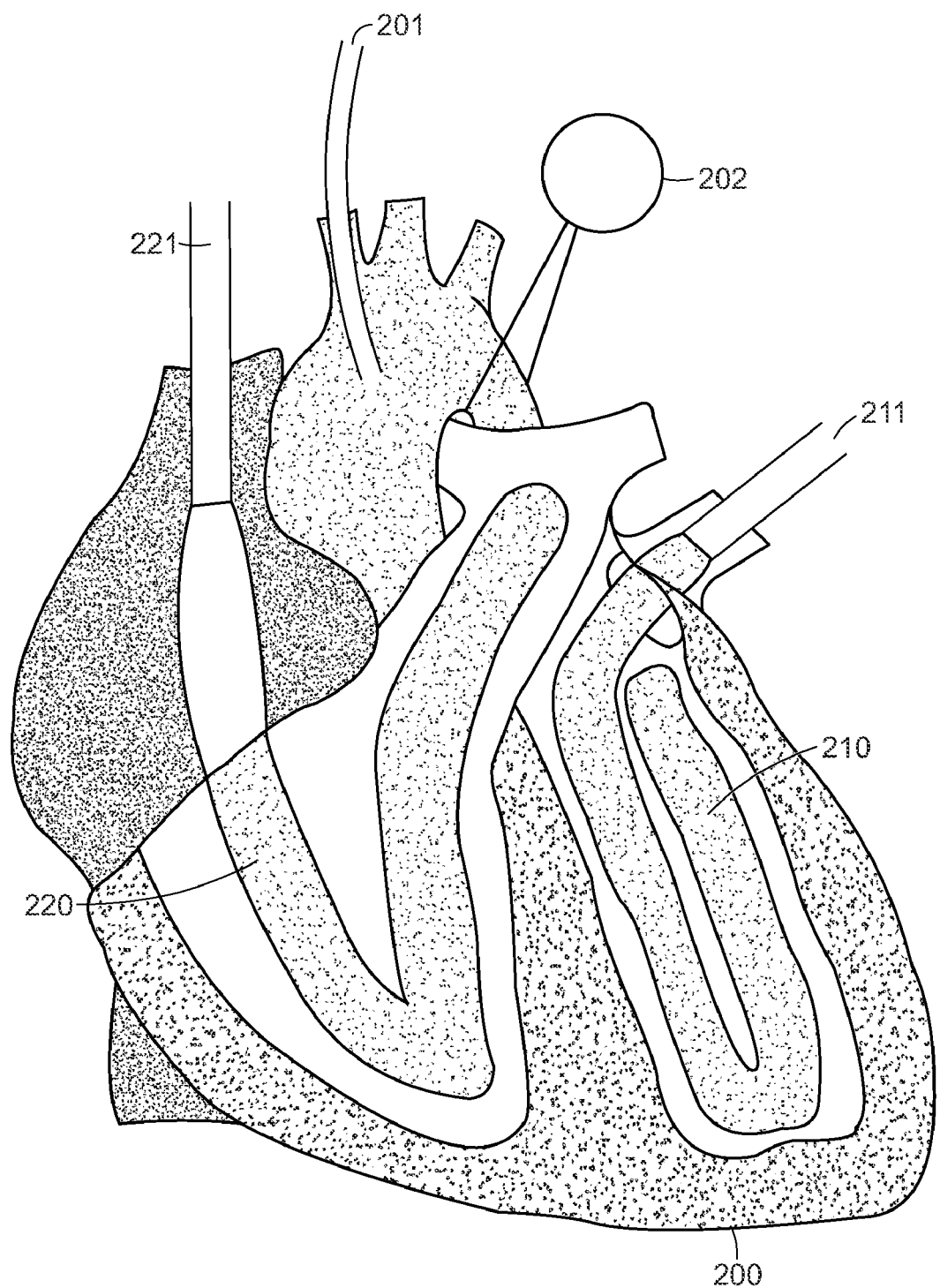
FIG. 2 illustrates a porcine heart as used in the present invention with latex rubber balloons inserted through atrioventricular valves.

In the present invention, an external pulsatile pump is used to cause the porcine heart to beat through use of intra-ventricular balloons placed inside the heart and connected to the pump by tubing. The balloons placed through atrioventricular valves into ventricular cavities are an important feature of the present invention. In a preferred embodiment, the balloons are constructed from expandable latex rubber. As shown in FIG. 2, right ventricular balloon 220 extends into the right ventricular cavity of the porcine heart 200, and left ventricular balloon 210 extends into the left cavity. FIG. 2 also illustrates aortic clamp 202 used during surgery. Left pneumatic pump line 211 is used to inflate left ventricular balloon 210, and right pneumatic pump line 221 is used to inflate right ventricular balloon 220. Fluids pumped in through coronary perfusion line 201 allows for authentic simulation of coronary perfusion during in the simulated surgical environment. In order to most realistically simulate an actual operating room environment, the tubing that connects the pulsatile pump to the ventricular balloons is positioned such that it is not visible to the trainee surgeon.

Figure 8:
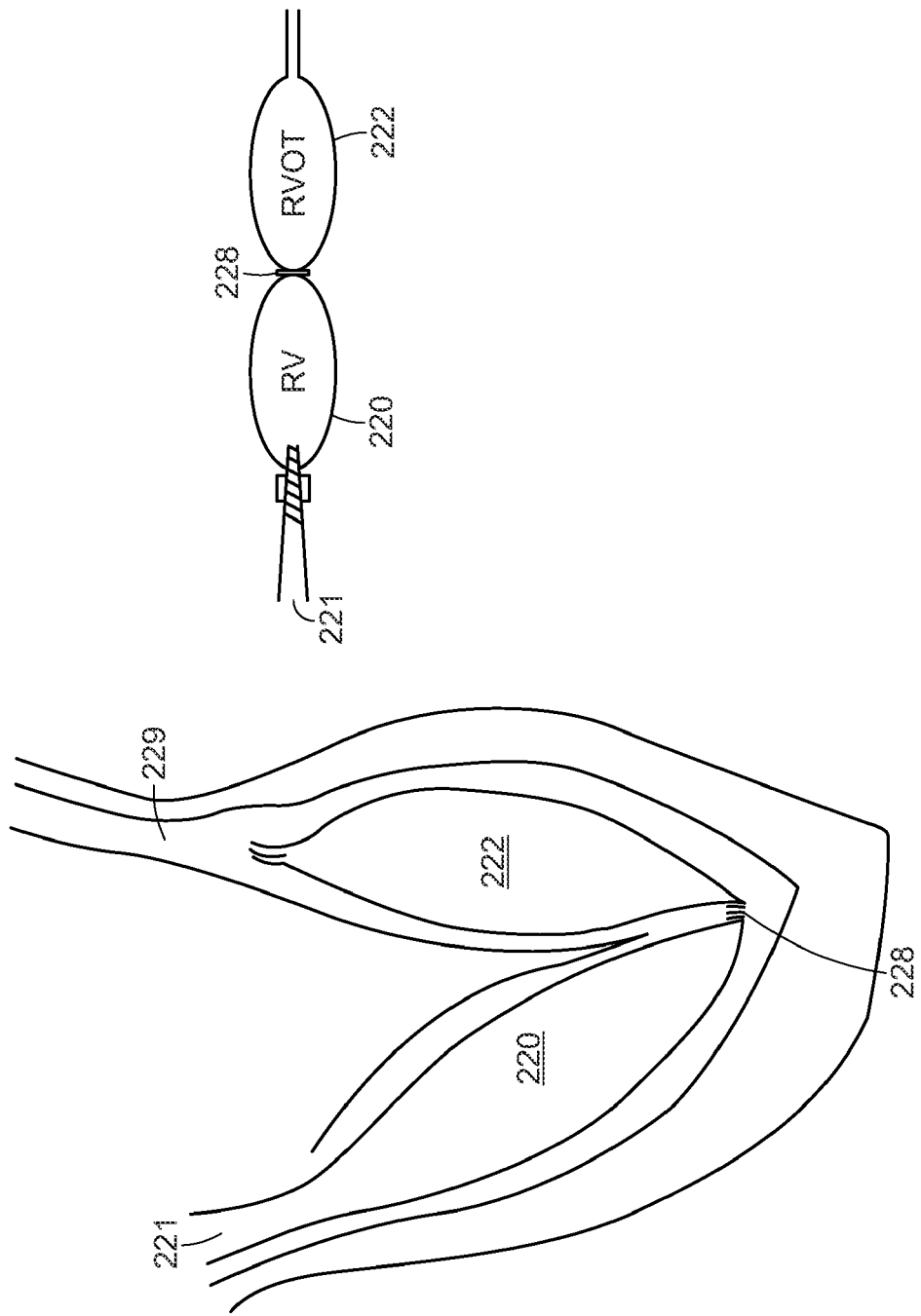
FIG. 8 illustrates an embodiment in which the right ventricular balloon is knotted to create a right ventricular outflow tract.
Figure 9:
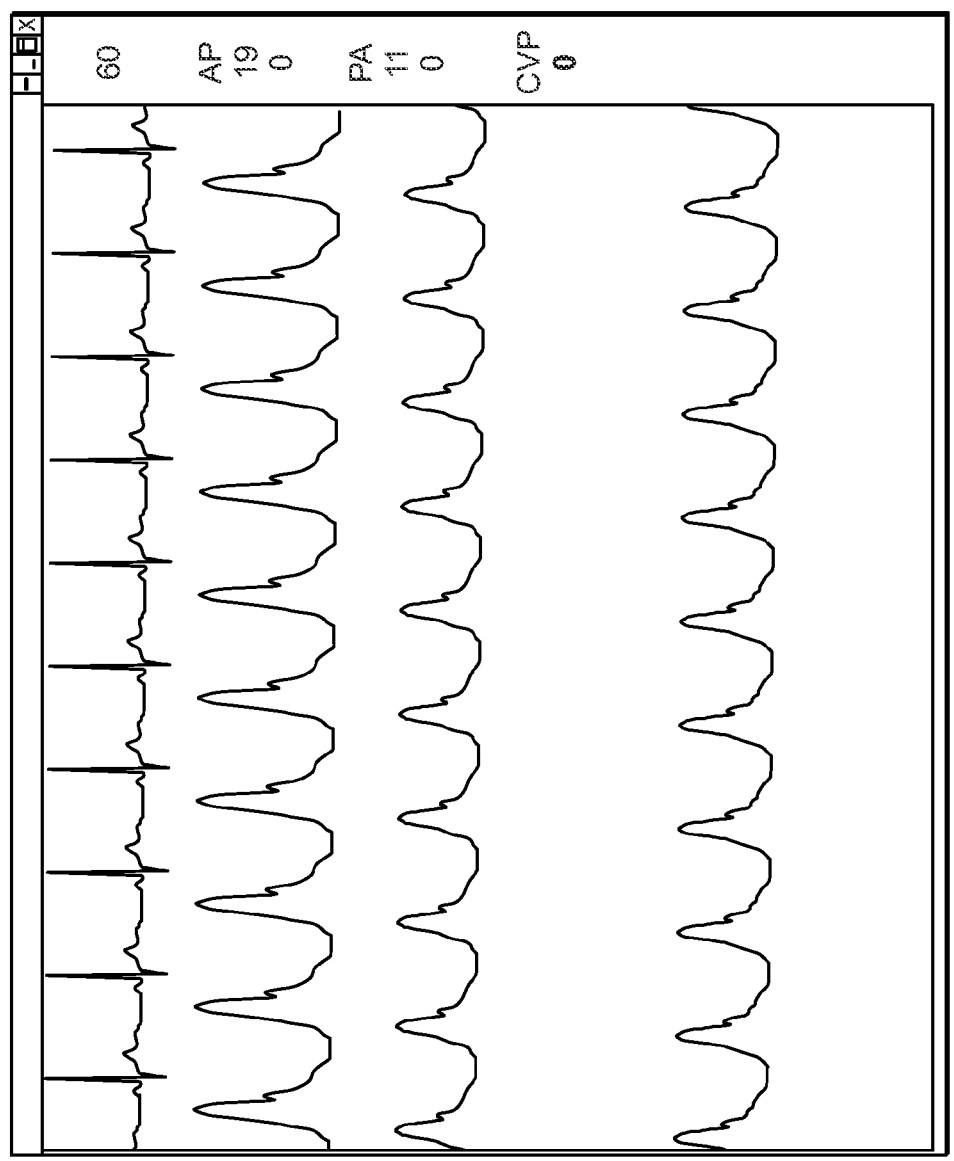
FIG. 9 illustrates a simulated vital signs monitor display.

In one embodiment, one or both balloons may have knots tied approximately in the center in order to provide for a more realistic beating heart. Alternatively, multiple balloons may be used in series. For example, FIG. 8 illustrates the right ventricular balloon 220 knotted at 228 creating right ventricular outflow tract (RVOT) 222. RVOT refers to the pathway that blood, or in the simulated hart, the balloon, must travel to exit the right ventricle of the heart and enter the pulmonary artery 229. As shown in FIG. 8, right ventricular balloon 220 inflates and deflates with the electromechanical pup, while RVOT 222 remains inflated. Therefore, as right ventricular balloon 220 inflates, a passive pulsation is transferred to RVOT, which enhances the left ventricular balloon pulsation by simulating motion on pseudo-systole.

Figure 4:
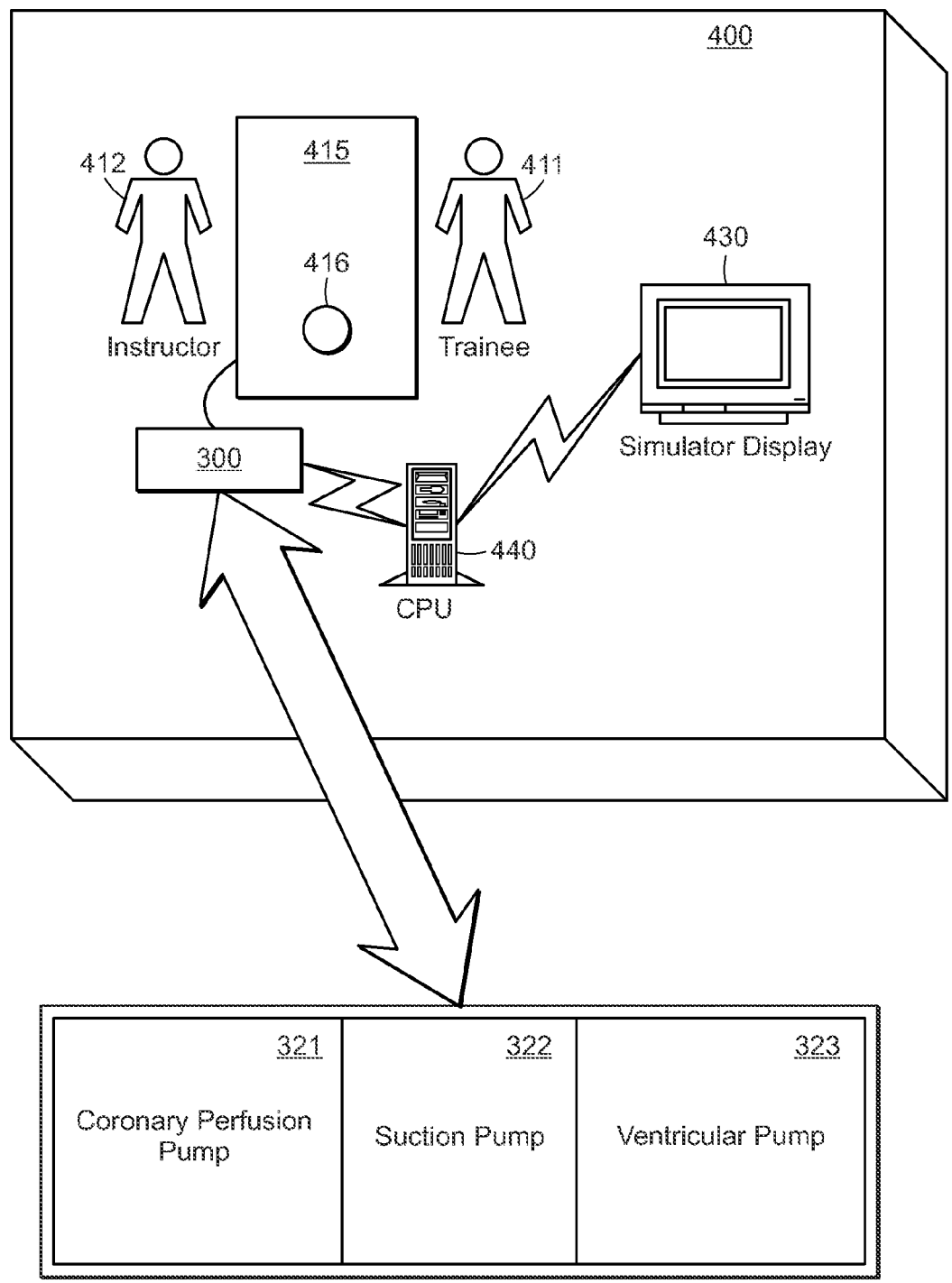
FIG. 4 is a block diagram illustrating the components of the inventive simulator system.

FIG. 4 illustrates components of the simulated surgical environment. As shown, surgical trainee 412 is trained by instructor surgeon 411 in training surgical theater 400. Operating table 415 with mock chest cavity 416 similar to the one illustrated in FIG. 1 is connected to simulator pumping system 300. As discussed above, the tubing that connects the pumping system to the ventricular balloons is positioned such that it is not visible to the trainee surgeon.

Pumping system 300 is preferably comprised of three pumps—ventricular pump 323, coronary perfusion pump 321 and suction pump 322. In a preferred embodiment, all three pumps are integrated and controlled by the same computer, however, each may be separately controlled. Coronary perfusion pump 321 is used to pump fluid into coronary arteries to simulate blood that emerges during the grafting procedure (coronary perfusion). It is connected to coronary perfusion line 201 in FIG. 2. Suction pump 322 is used to remove this fluid from the chest cavity. Suction pump 322 is similar to or identical to pumps used to remove fluids during real surgery. Ventricular pump 323 is the pump used to inflate and deflate the balloons in the porcine heart to simulate human heart beating, and is connected to pneumatic line 221 to the left ventricular balloon, and pneumatic line 211 to the right ventricular balloon. In an alternative embodiment, separate ventricular pumps may be used for each line.

As shown in FIG. 4, CPU 440 may be used to control the pumping system 300, as well as provide output to simulator display 430. Simulator display 430 is preferably a monitor or monitors similar to the monitors used in actual surgery. For example, simulator display 430 may include monitors for electrocardiogram (ECG), blood pressure, oxygen saturation, and temperature. The trainee surgeon can visually observe the simulator display, as he would watch real monitors during actual surgery. These components will be described in more detail below.

In one embodiment of the present invention, ventricular pump 323 may be a rotary pump that compresses a bladder connected to the balloons via tubing. However, pneumatic pumps are preferred as they are smaller and more versatile.

In a preferred embodiment, pump 323 is an electromechanical pneumatic pump driven from the reciprocating motion of a precision linear actuator. As will be obvious to those skilled in the art, any number of pneumatic pump designs may be used with the linear actuator, including diaphragm, cylindrical bladder and piston configurations. In a preferred embodiment, a diaphragm is used, although other configurations will be obvious to those skilled in the art, and are intended to come within the scope of the present invention.

Figure 3:
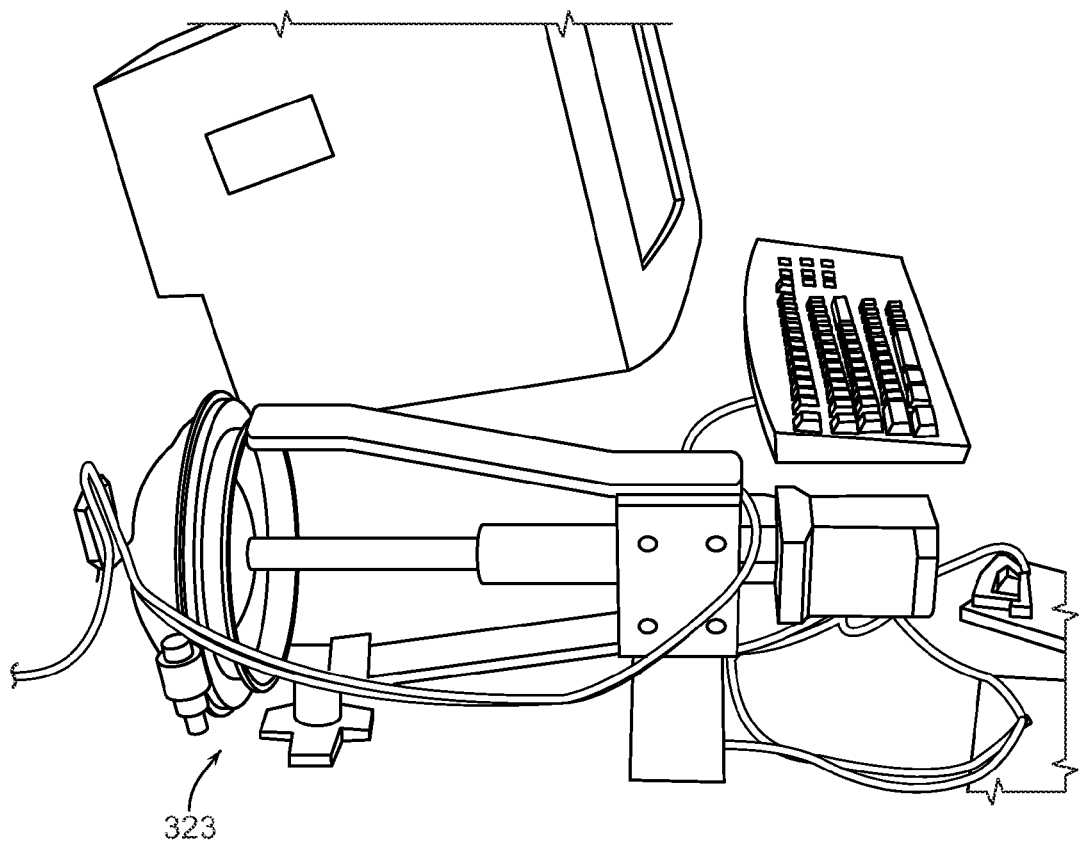
FIG. 3 is an illustration of a prototype of the inventive computer-controlled electromechanical pump based on linear actuator driving a diaphragm.

FIG. 3 illustrates a prototype of a pulsatile diaphragm-type air pump driven by a linear actuator, according to the present invention. The linear activator is fitted with a high torque stepper motor, capable of providing the relatively large thrust force required to produce sufficient air pressure. In one configuration, the motor provides a thrust of about 450N to produce an air pressure of about 100 mm Hg gauge, up to a maximum of about 150 mm Hg gauge. The operation of the stepper motor is controlled by signals from an external driver microprocessor board. A number of the motion parameters, such as length of stroke, frequency and acceleration are user selectable, as will be discussed below.

In one configuration, the diaphragm-type pneumatic pump is constructed from iron and steel welded together to produce a cavity approximately 150 mm square by 25 mm deep. The diaphragm may be constructed from approximately 3 mm thick neoprene rubber that is clamped to the casing by means of a steel frame and screws. Air exchange with the intraventricular balloons takes place through a plastic tube connected to a port in the side of the pump casing. In this configuration, the pump is sized to produce a total air displacement of about 220 ml at a maximum stroke of 1".

Figure 5:
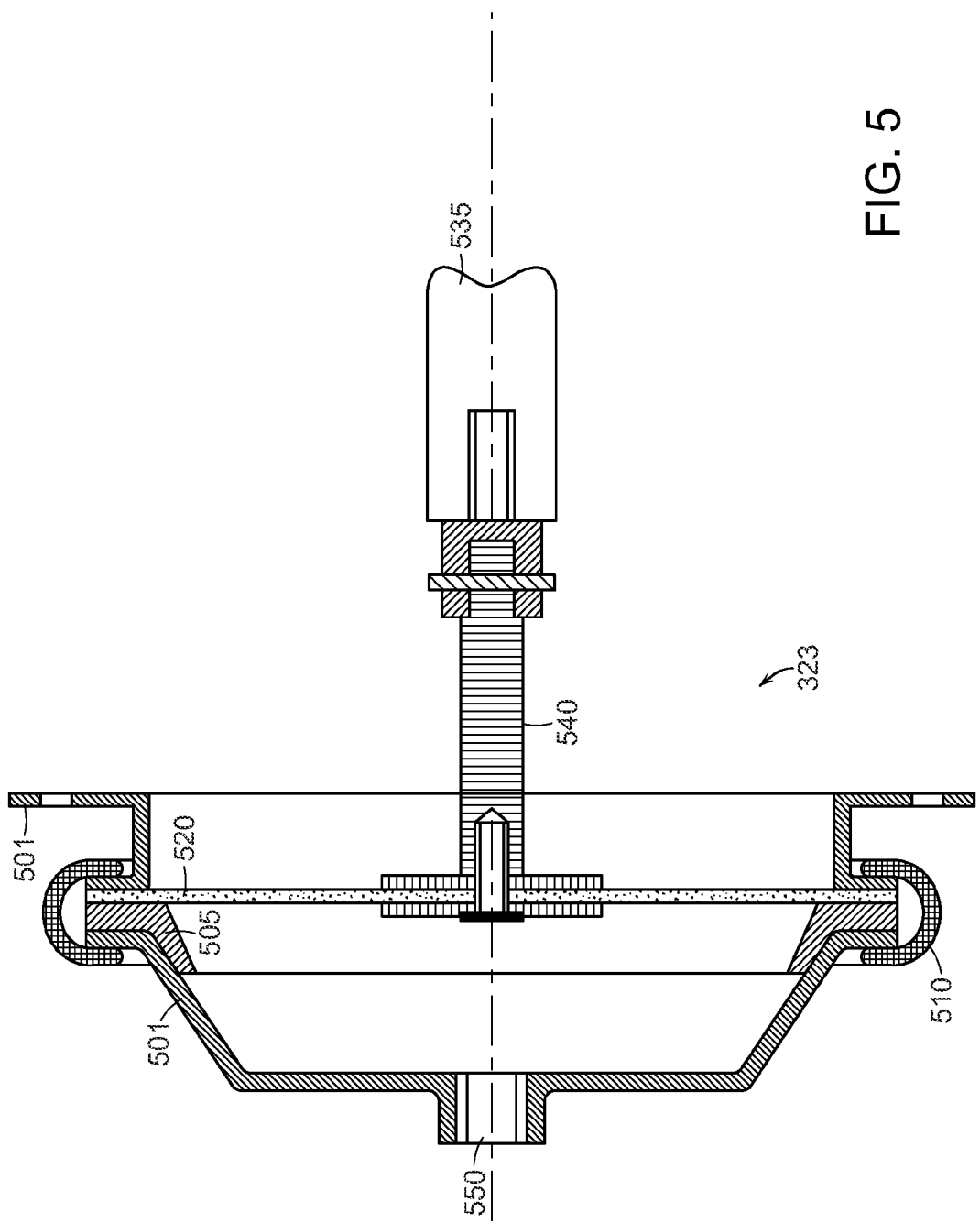
FIG. 5 is a cross-sectional view of the diaphragm pump used in the present invention.

FIG. 5 illustrates a cross-sectional view of a diaphragm-type pneumatic pump 323 that may be used with the inventive system. As shown, the pump is comprised of metal casing 501 and metal clamps 510 around a rubber seal 505. The diaphragm 520 is activated by actuator 535 through shaft 540. Port 550 is used to connect the pump to the intra-ventricular balloons through tubing.

The inventive pulsatile pump can reproduce a range of normal and abnormal cardiac rhythms in a preserved in vitro porcine heart, by inflating and deflating the intra-ventricular balloons inserted inside the heart by changing the actuator configuration. A beats-per-minute pumping frequency f can be set by selecting a stroke length s, acceleration a, and pitch k of the actuator thread. In one embodiment, the formula used to calculate beats-per-minute (bpm) frequency f, is $f=\sqrt{[(ka)/s]}$.

In a preferred embodiment, software provided with the actuator allows the actuator driver to be configured. The actuator attempts to ensure a constant preset acceleration from its extreme up to mid-extension or retraction, followed by constant deceleration, thereby approximating a quadratic form. Therefore, by changing the stroke length and acceleration, various beating patterns in the porcine heart can be produced.

In one embodiment of the inventive system, the maximum f is 148 bpm for a 1" stroke of the actuator, which is more than adequate for normal heart beating, 222 bpm for a 0.5" stroke which is adequate for fast abnormal rhythm (e.g. tachycardia), and a 0.2"-0.1" stroke enables authentic simulation of ventricular fibrillation, up to 400 bpm. By enabling the simulated beating heart to beat at these three types of rhythms allows authentic simulation of a beating heart during surgery—both normal and abnormal rhythms typically encountered in beating heart cardiac surgery.

The inventive pump is preferably computer-controlled by a computer system that allows manual inputting of parameters and surgeon instructions. In the embodiment shown in FIG. 4, CPU 440 accepts manual input and surgical instructions, controls pumping system 300, and controls the display of simulated vital signs on simulator display 430.

Figure 6:
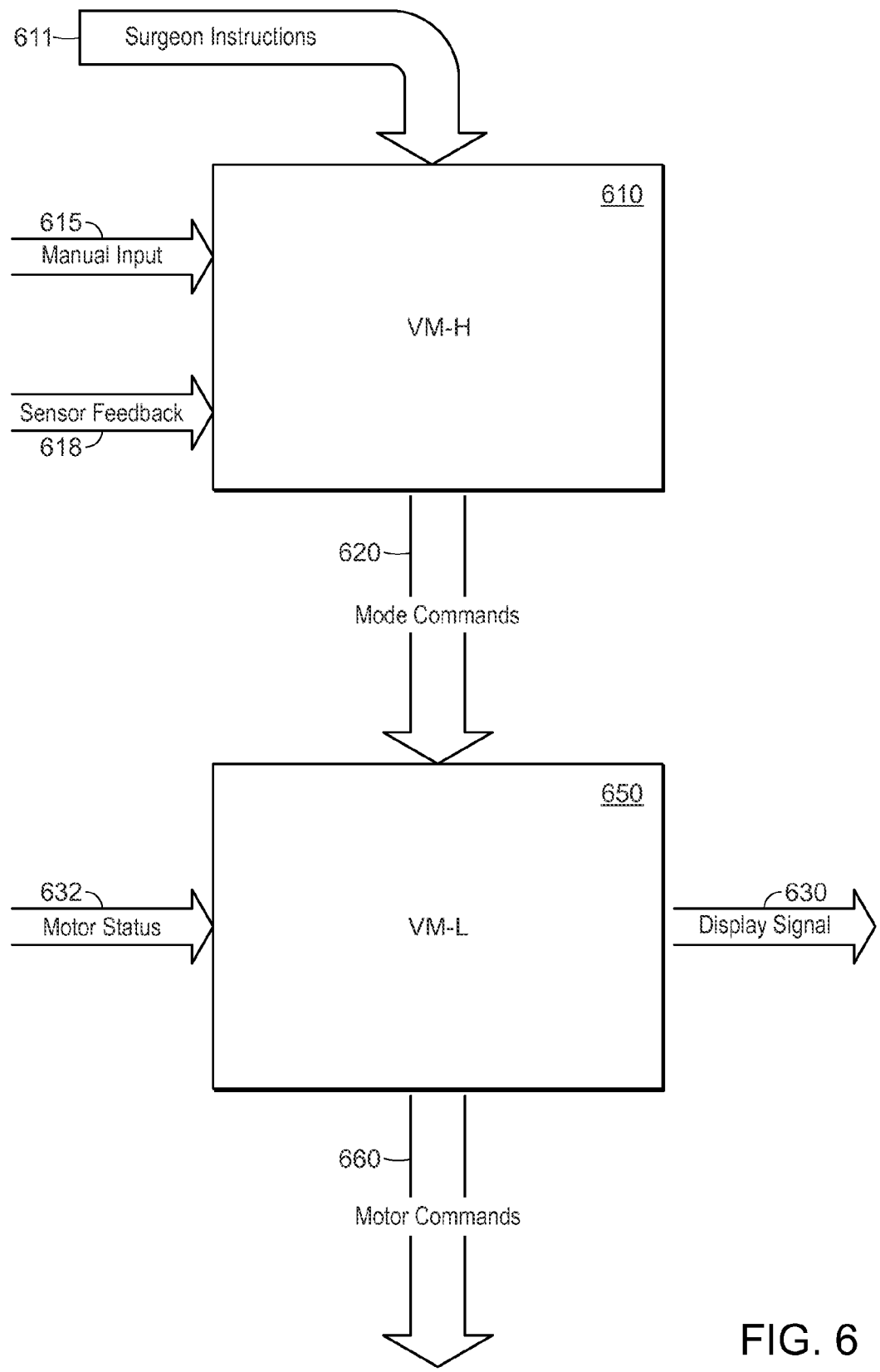
FIG. 6 illustrates software architecture for the inventive simulator system.

In a preferred software architecture for the computer-controlled system, two virtual machines are operated in series, as shown by FIG. 6.

A high-level virtual machine VM-H (610) allows an instructor surgeon to describe the sequence of behaviors 611 that he would like to be simulated by the porcine heart. Preferably, the entire medical operation to be simulated can be described in a language appropriate to a person with surgical training. VM-H 610 may process instructions 611 through natural language interpretation, or other type of suitable language interpretation known to those skilled in the art. Alternatively, instructions 611 may be entered through an interactive computer program. Many methods of obtaining and interpreting simulation instructions will be obvious to one skilled in the art, and are intended to come within the scope of the present invention. The instructions preferably include contingencies for the events that may be triggered during a simulation. Preferably, the instructor surgeon can also modify instructions after the simulation has started.

In addition, VM-H 610 also preferably supports manual input 615, such as through a keyboard or mouse, or any other user-entry device. These inputs are used to simulate various events that arise from the direct intervention of the trainee surgeon such as the administration of drugs or the application of a defibrillator. Keyboard or other manual input may also be used by the instructor surgeon to manually trigger events that may alter the course of a simulation. VM-H 610 also preferably receives input from sensor measurements 618 that provide feedback to the system, such as, for example, from a pressure sensor. Sensor inputs are interpreted in the context of the current state of VM-H 610 to spontaneously trigger events. For example, in a preferred embodiment, VM-H may be configured to register a mishandling of the heart by the trainee surgeon if the pressure sensor reading deviates sufficiently far from its normal reading, and trigger the heart to simulate a ventricular fibrillation.

VM-H 610 outputs a sequence of mode commands 620 to be interpreted by the low-level virtual machine VM-L (650).

VM-L 650 generates and manages a sequence of driver commands and feedback required to implement simulation of the various cardiac beating modes potentially present during beating heart surgery, and handles manual input to change mode.

A mode is defined as a particular beating state of the heart, and there are typically 4 kinds of mode changes. A "Sequenced" mode change is selected at a specific point within the sequence of steps during the operation, and is typically specified by the instructor surgeons's instructions to VM-H. A "Scheduled" mode change occurs after a specified period of time has elapsed in the operation, and is also typically specified in the instructor surgeon's instructions. This mode change is typically sent from the VM-H to VM-L to ensure correct context for the event. An "Immediate" mode change is manually selected, typically by the instructor surgeon, usually from a computer keyboard, and is intended to invite an immediate response from the trainee surgeon. A "Sensor-Triggered" mode change results from feedback from the system, for example, from a pressure sensor. A Sensor Triggered mode change may result from the trainee surgeon's action, such as squeezing the heart. In a preferred embodiment, VM-L handles the response to Sensor-Triggered mode changes, but VM-H should be able to enable and disable triggers during the course of the simulated operation. VM-H may also be able to change the sensitivity of the triggering depending on other factors, and specify how quickly the trigger is to be acted upon.

VM-L 650 manages the sequence of driver commands necessary to implement the various cardiac modes, and manages mode changes. VM-L 650 is responsible for changes in the observables of the system, in particular driving the motor that controls the pumping system, and for generating graphs or numeric readings of simulated vital signs, including for example, electrocardiogram (ECG), blood pressure, oxygen saturation, and temperature on simulator displays 430. VM-L 650 manages the interface to the visual and auditory displays that make up simulator display 430.

The actuator motor that controls the pulsatile ventricular pump is preferably controlled by a dedicated hardware driver that understands instructions sent over a serial port. VM-L 650 interprets each mode command 620 in order to issue appropriate instructions 660 to the hardware driver as well as to modify the simulator display 430 appropriately through monitor signals 630. Its purpose is to abstract away the many factors that comprise the simulated patient's heart being in a particular state. In addition to mode command input 620, VM-L 650 also handles signals from the motor (motor status 632) in order to properly manage the motor's limited instruction buffer.

A mode, or state of beating heart, is a collection of rhythm patterns that govern the measurements displayed on the simulator display as well as the pump motor drive. A mode can be divided into three components—a waveform generator which describes the shape of one period of the rhythm, the period duration, and amplitude scaling. When a mode is in effect, VM-L produces a set of periodic functions in time that are displayed on the simulator display, and generates the associated stream of motor control commands. A mode command issued from VM-H may therefore cause change, via VM-L, in any or all of the three components of the current mode. Aperiodic waveforms can be generated by issuing mode commands that modify the generators of the current mode sufficiently frequently.

Figure 7:
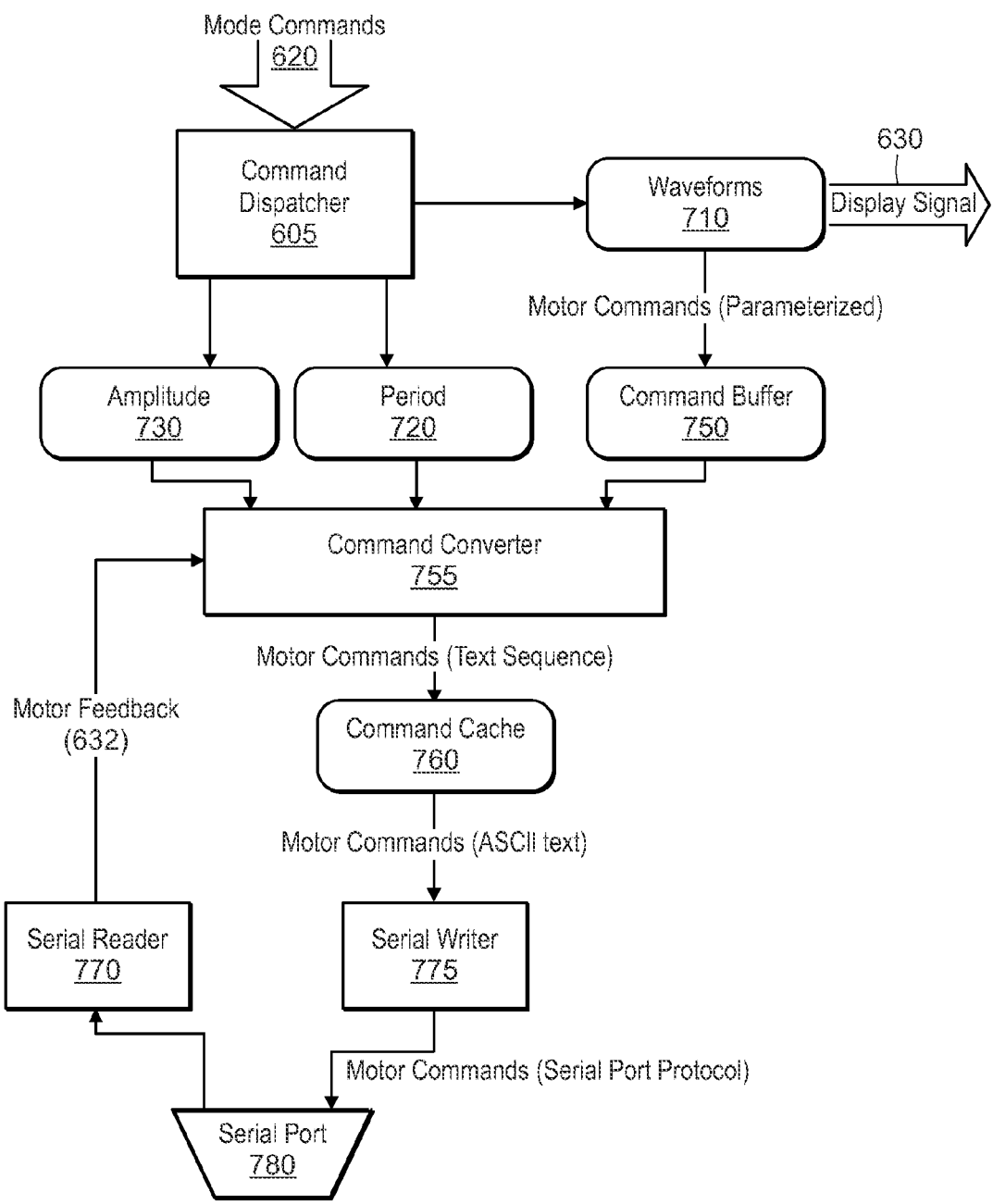
FIG. 7 is a block diagram illustrating the components of the Low-level virtual machine (VM-L) of the present invention.

FIG. 7 illustrates the components of VM-L and the relationship between the components. In particular, VM-L consists of three storage areas, one for each of the three components of a mode command—waveforms 710, period duration 720, and amplitude 730. The components of a mode combine to produce a periodic function in time. Each waveform generator is normalized to have a maximum displacement of 1, and a value of 0 for time values outside the range between 0 and 1. A periodic waveform is produced by dilating the generator in time by the period and vertically by the amplitude and convolving the result with an impulse train with unit magnitude and period as specified. The result is the same as pasting copies of the scaled generator in succession to produce a periodic function in time. The resulting waveforms can be rendered graphically through display signals 630, and appropriate signals to replicate the waveform can be delivered to the motor through motor commands.

VM-L 650 constantly communicates with the motor's controller, preferably through a serial link 780. The serial writer 770 and reader 775 components represent threads of communication that are dedicated to communicating with the motor's controller. Command cache 760 stores all the commands necessary to produce one period of motor motion. Its contents are continuously read by serial writer 775 and transferred over the serial link 780 to the motor's controller.

The contents of the command cache 760 change only if a mode command is issued that affects the value of one of the three components of a mode—waveform, amplitude or period duration. If the motor driver generator changes, the new generator is compiled into a sequence of parameterized motor commands, which are stored in command buffer 750. Typical motor commands include instructions to set its velocity or acceleration, or to pause momentarily. These types of instructions require numeric arguments and it is these that have a special representation so that they can be "scaled" by the amplitude and the period. In this context, scaling really means modifying the numeric argument to the instruction so that the resulting motion of the motor matches the specified mode. This scaling is done through the command converter 755, and the resulting motor commands are stored in command cache 760.

If either the amplitude or the period changes, the motor commands in the command cache are regenerated by scaling the parameterized instructions stored in the command buffer.

When programmed with reciprocating actions of varying frequency and stroke length, the system produces authentic normal beating, tachycardia and ventricular fibrillation patterns. Serial communication and loading of a waveform to the actuator motor driver enable the ventricular pump to produce these beating functions in the porcine heart.

In one embodiment, feedback via pressure sensors incorporated into the pumping system can detect handling of the heart during surgery. As handling of the heart during real surgery often leads to ventricular fibrillation requiring immediate response by the surgeon, being able to detect handling in the simulator system and triggering ventricular fibrillation provides a realistic operating environment for the trainee surgeon.

In this embodiment, a bridge-type pressure sensor 810 is incorporated into the pumping system. The differential voltage output by the pressure sensor may be converted in a single-ended output using a conventional instrumentation amplifier circuit. An analog-to-digital converter, such as an ADC 0804 8-bit analog-to-digital converter, may be used to convert this to a digital output.

The linear actuator driver board used to drive the pulsatile pump preferably has a digital input port which can be read at any time while the motor is running by means of a command to the serial port. This port is normally used with a home sensor which is a reed switch employed to prevent overextension of the actuator, however, this function uses only one bit. The other bits are therefore used in this embodiment to read the pressure from the digital output from the analog-to-digital converter described above. Alternatively, a separate I/O channel could be used.

In this embodiment that includes a pressure sensor, the sensor may be set so that it varies between 0 and 50% of full scale deflation as the heart is beating normally. A threshold may be set so that a pressure reading above 80% full scale deflation automatically triggers cardiac arrest (v-fib mode). Achieving this threshold results in a flag being set which causes a change of mode after the current beat has been completed. Other methods of reading the pressure and setting v-fib flags will be obvious to those skilled in the art, and are intended to come within the scope of the present invention.

Simulator display 430 may include vital sign trace data similar to that seen in real cardiac surgery, such as Electrocardiograph ECG output, arterial pressure, central venous pressure, pulmonary arterial pressure and oxygen saturation. Simulator display of vital signs is preferably designed such that 600 samples of each trace fits horizontally, i.e. giving a horizontal sweep of 12 seconds. Each of the traces is stored as a template representing a typical form of that trace. Audio samples may be used for the beep coinciding with each ECG peak, and a constant tone occurring during v-fib.

In a preferred embodiment, the VM-L is managed by and works with the VM-H. However, the VM-L could be used alone to control the electromechanical pumping system. In such an embodiment, function keys may be assigned to allow setting the heart to normal beating rates of 30, 60, 90 and 120 bpm, tachycardia at 300 bpm, in increase current rate by 10 bpm, to cause v-fib immediately, to cause defibrillation back to normal beating and to enable-disable v-fib. These kinds of functions would normally be coordinated through the VM-H.

Software developed to implement VM-H and VM-L functions can be any known to one skilled in the art, such as C++. In one embodiment, the low-level VM cycle can be implemented entirely within a windows WM-TIMER event in which all of the pump driving, sensor reading and vital sign data generation processes occur, followed by a WM_PAINT event to update simulator displays.

Preferably, during each VM-L timer event, at least three actions occur—the pump is driven or managed, pressure is measured and vital sign traces or other status information intended for use by the simulator displays is generated.

In one embodiment, pump (actuator) commands are sent to the linear actuator at each sample. In an alternative embodiment, the pump may be controlled only once per beat, at a fixed delay from the start of the beat. In this embodiment, the pump is set on a predetermined trajectory initiated at a fixed interval after the stored ECG peak. In this embodiment, the pump control sequence is (1) set velocity, (2) set acceleration, during extension, (3) set deceleration, during retraction, (4) set feed displacement, during extension, (5) feed-to-length, (6) set feed displacement, during retraction, and (7) feed-to-length. The time to complete the beat in this embodiment must be less than the beat interval, to avoid overlapping of timer events.

As will be obvious to those skilled in the art, the configuration of the pump and its inputs may be set so as to more realistically simulate a beating heart during cardiac surgery. For example, in the embodiment using the diaphragm-type pump described above, a 1" stroke may be set for beating speeds up to 120 bpm representing normal to slow tachycardia, a 0.5" stroke for 300 bpm for faster tachycardia, and a 0.1" stroke for 500 bpm, representing the vibration of the heart during ventricular fibrillation (v-fib). The acceleration may be set to be 20% greater than the deceleration, so that heart balloons will deflate more quickly than they inflate. In addition, the set point of the pump may be shifted for v-fib so as to make the heart appear more inflated during cardiac arrest.

In a preferred embodiment, the simulation system of the present invention is used in a training regime. This training regime is designed to take a surgical trainee through a set of predefined simulated surgical procedures under the supervision of a trained surgeon.

As will be obvious to one skilled in the art, the inventive simulation system could be used in many different types of surgical training situations, and should not be limited to use only for CABG surgical training.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A method of simulating a beating heart in a mock chest cavity in an operating room environment for training a trainee surgeon for cardiac surgical techniques, comprising:
    providing a simulator heart in the mock chest cavity, the simulator heart including a preserved porcine heart with at least one balloon being inserted therein;
    providing a pumping system connected to the at least one balloon, the pumping system being operative to inflate and deflate the at least one balloon and with the at least one balloon being disposed in a ventricular cavity of the preserved porcine heart to stimulate heartbeats in the simulator heart and the pumping system further being connected to the simulator heart to circulate fluid through the simulator heart during at least a time when heartbeats are stimulated,
    wherein the pumping system includes a pulsatile pump for pumping the simulator heart in a rhythm manner to simulate a heartbeat, an infusion pump to pump fluid to the simulator heart to simulate coronary perfusion, and a suction pump to remove fluid from the chest cavity; and
    providing a control computer, the control computer being connected to the pumping system: the control computer for controlling and managing a pumping system and thereby the simulator heart.

2. The method of claim 1, wherein providing the simulator heart additionally includes providing simulator preserved coronary arteries with the preserved porcine heart.

3. The method as recited in claim 1, wherein at least two balloons are inserted into the preserved porcine heart.

4. The method of claim 1, wherein the pulsatile pump is a diaphragm-type pneumatic pump driven by a linear actuator.

5. The method of claim 1, wherein the method further includes a simulator display in the operating room environment connected to the control computer, with the control computer causing the simulator display to display simulated vital signs corresponding to a state of the simulator heart.

6. The method of claim 1, wherein the pumping system simulates a range of normal and abnormal heart rhythms.

7. The method of claim 2, wherein the simulator preserved coronary arteries include preserved bovine arteries.

8. The method of claim 3, wherein a first balloon is inserted into the left ventricular cavity of the preserved porcine heart, and a second balloon is inserted into the right ventricular cavity of the preserved porcine heart.

9. The method of claim 8, the first balloon being connected to the pumping system through a first pneumatic pump line, and the second balloon being connected to the pumping system through a second pneumatic pump line.

10. The method of claim 1, wherein the control computer drives the pulsatile pump, the infusion pump and the suction pump.

11. A beating heart simulator in a mock chest cavity, comprising:
   a simulator heart in the mock chest cavity, the simulator heart including a preserved porcine heart with at least one balloon being inserted therein;
   a pumping system connected to the at least one balloon, the pumping system being operative to inflate and deflate the at least one balloon and with the at least one balloon being disposed in a ventricular cavity of the preserved porcine heart to stimulate heartbeats in the simulator heart and the pumping system further being connected to the simulator heart to circulate fluid through the simulator heart during at least a time when heartbeats are stimulated,
   wherein the pumping system includes a pulsatile pump for pumping the simulator heart in a rhythm manner to simulate a heartbeat, an infusion pump to pump fluid to the simulator heart to simulate coronary perfusion, and a suction pump to remove fluid from the chest cavity; and
   a control computer, the control computer being connected to the pumping system: the control computer for controlling and managing a pumping system and thereby the simulator heart.

12. The system of claim 11, wherein at least two balloons being inserted into the preserved porcine heart, a first balloon being inserted into the left ventricular cavity of the preserved porcine heart, and a second balloon being inserted into the right ventricular cavity.

13. The system of claim 11, wherein the at least one balloon being knotted before being inserted into the preserved porcine heart.

14. The system of claim 11, wherein the knotted balloon being inserted into the fight ventricular cavity of the preserved porcine heart.

15. A method of simulating a beating heart in a mock chest cavity in an operating room environment for training a trainee surgeon for cardiac surgical techniques, comprising:
   providing a simulator heart in the mock chest cavity, the simulator heart including a preserved porcine heart with at least one balloon being inserted therein;
   providing a pumping system connected to the at least one balloon, the pumping system being operative to inflate and deflate the at least one balloon and with the at least one balloon being disposed in a ventricular cavity of the porcine heart to stimulate heartbeats in the simulator heart and the pumping system further being connected to the simulator heart to circulate fluid through the simulator heart during at least a time when heartbeats are stimulated,
   wherein the pumping system includes a pulsatile pump for pumping the simulator heart in a rhythm manner to simulate a heartbeat, an infusion pump to pump fluid to the simulator heart to simulate coronary per fusion, and a suction pump to remove fluid from the chest cavity; and
   providing a control computer, the control computer being connected to the pumping system, with the control computer controlling and managing the pumping system and thereby the simulator heart in a plurality of operating modes including a sequenced mode, a scheduled mode, an immediate mode, and a sensor-triggered mode.

16. The method of claim 15, wherein providing a simulator heart further includes providing simulator preserved coronary arteries with the preserved porcine heart.

17. The method as recited in claim 15, wherein at least two balloons are inserted into the preserved porcine heart.

18. The method of claim 15, wherein the pumping system includes a pulsatile pump, and the pulsatile pump is a diaphragm-type pneumatic pump driven by a linear actuator.

19. The method of claim 15, wherein the method further includes a simulator display in the operating room environment connected to the control computer, with the control computer causing the simulator display to display simulated vital signs corresponding to a state of the simulator heart.

20. The method of claim 16, wherein simulator preserved coronary arteries include preserved bovine arteries.

21. The method of claim 17, wherein a first balloon is inserted into the left ventricular cavity of the preserved porcine heart, and a second balloon is inserted into the right ventricular cavity of the preserved porcine heart.

22. The method of claim 21, wherein the first balloon being connected to the pumping system through a first pneumatic pump line, and the second balloon being connected to the pumping system through a second pneumatic pump line.

23. The method of claim 15, wherein the control computer drives the pulsatile pump, the infusion pump and the suction pump.

* * * * *